MACHINE FOR HANDLING SEMICONDUCTOR MATERIAL

Filed May 9, 1960 3 Sheets-Sheet 1

Inventor
C. E. Bicknell
By
Attorneys

Inventor
C. E. Bicknell
By Holcombe, Wetherill & Brisebois
Attorneys

Inventor
C.E. Bicknell
By Holcombe, Wetherill & Brisebois
Attorneys 3,080,053

MACHINE FOR HANDLING SEMICONDUCTOR MATERIAL

Charles E. Bicknell, Cambridge, England, assignor to Pye Limited, Cambridge, England, a British company Filed May 9, 1960, Ser. No. 27,611
Claims priority, application Great Britain May 14, 1959
13 Claims. (Cl. 209—88)

Figure 1:
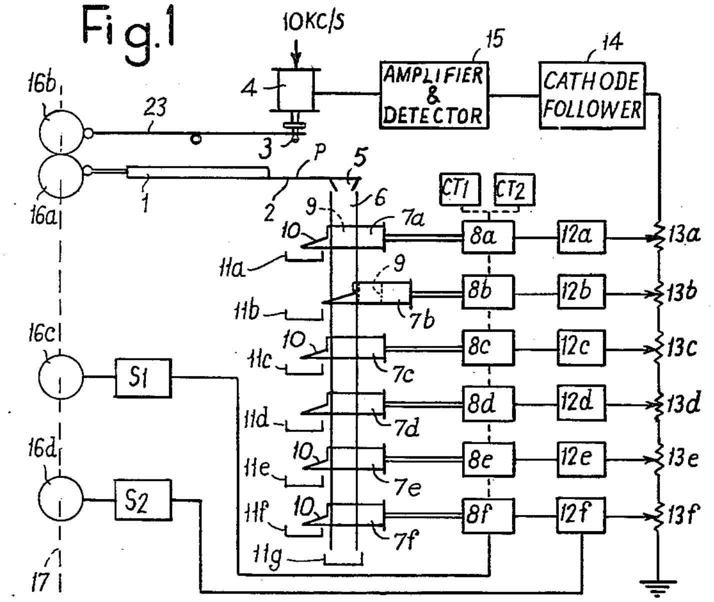

The present invention relates to a machine for handling small pieces of semiconductor material such as are used in the manufacture of transistors and other semiconductor devices.

In the manufacture of transistors and other semiconductor devices, small pieces of semiconductor material, hereinafter referred to simply as "wafers," are cut from a block or slab of the material and afterwards have to be accurately measured and sorted according to size into different groups. The important dimension to be measured is the thickness of the wafer.

Particularly in the manufacture of transistors, the wafers are extremely small and are generally in the form of a circular disc. Thus the wafers may have a diameter of less than 0.10 inch and a thickness which is only a few thousandths of an inch. It will be appreciated that it is extremely difficult to handle and accurately measure the thickness of such small wafers without damage.

It is therefore an object of the present invention to provide a machine which can measure and sort according to size small wafers of a semiconductor material.

According to the present invention a machine for handling wafers of semiconductor material comprises means for feeding each of the wafers to a measuring position where a wafer is measured by a measuring device which produces an electrical output varying with the thickness of the wafer, this electrical output being employed to control means for directing the wafer, subsequent to being measured, into a desired location according to its thickness.

The machine may also include a counting mechanism for counting the total number of wafers which are measured, and/or a counting mechanism for counting the number of wafers of a given thickness or over a given range of thicknesses.

The wafers may be fed along a channel by means of a feed finger which pushes each wafer to a position where it is to be measured, the feed finger retracting from the wafer during the measuring operation in order to avoid it influencing the measuring operation. The measuring device preferably includes a probe which can be lowered to contact the upper surface of a wafer in the measuring position, the probe retracting from the wafer after effecting the measurement. The measuring device may also comprise a differential inductance fed with an alternating electric signal and producing an output which changes with movement of the probe in dependence upon the thickness of the wafer being measured.

After measurement, the wafer is moved from the measuring position and is directed into a desired location according to its thickness. The movement of the wafer from its measuring position may advantageously be effected by the same feed finger which again contacts the wafer and pushes it further along the channel to an aperture through which the wafer passes and is then directed to its desired location.

According to a feature of the invention, the wafer is arranged to drop through an aperture, down a tube across the bore of which extends a plurality of plungers, each of which is provided with an aperture of the same size as the bore of the tube and a deflector portion. Each of the plungers is capable of being operated in response to a signal from the measuring device and all of the plungers are normally located with respect to the tube so that the aperture through them is coaxial with the bore of the tube whereby none of the plungers impede the passage of a wafer down the tube. Each of the plungers is arranged to be responsive to a signal from the measuring device which represents a different thickness or range of thicknesses from that to which the other plungers respond and when a signal corresponding to any given thickness or range of thicknesses is produced from the measuring device the appropriate plunger is moved so that its deflecting portion extends across the bore of the tube whereby the wafer measured at that thickness drops on the deflecting portion in its travel down the tube and is deflected out through an aperture in the wall of the tube into a container.

In order to prevent the operation of the plungers from upsetting the measuring operation due to vibration, which may result in breakage of the wafers whilst the measuring probe is in contact with a wafer, means are provided to delay the operation of the appropriate plunger until after the probe has lifted from contact with the wafer being measured. Such delay means may advantageously consist of a switch controlled in conjunction with the raising and lowering of the measuring probe.

According to a further feature of the invention a series of cams are provided for controlling the movement of the feed finger, the raising and lowering of the measuring probe and the switch delaying the operation of the plunger until after the measuring operation has been completed. The cam controlling the operation of the switch also ensures that the plunger is not released until after a measured wafer has been given ample time to fall and be deflected into the appropriate container.

A safety device may be provided which prevents the direction of a measured wafer into an incorrect location. Where a plurality of containers are provided for respectively receiving wafers of different thicknesses or of different ranges of thicknesses, the safety device may take the form of a switch which prevents the machine from operating unless all of the containers are in their correct positions for receiving measured wafers.

Figure 2:
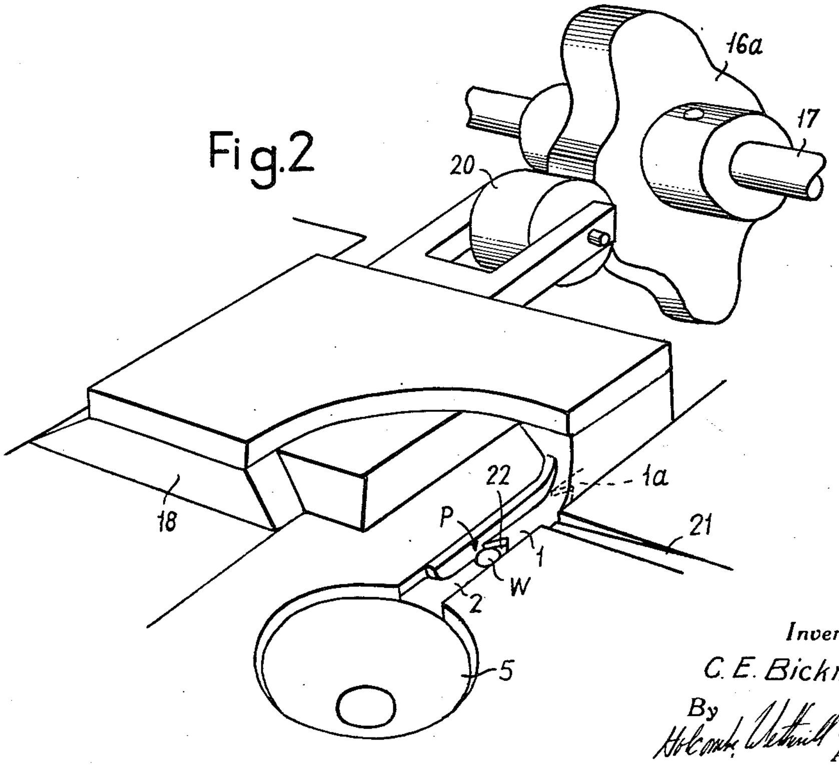
Figures 3, 4:
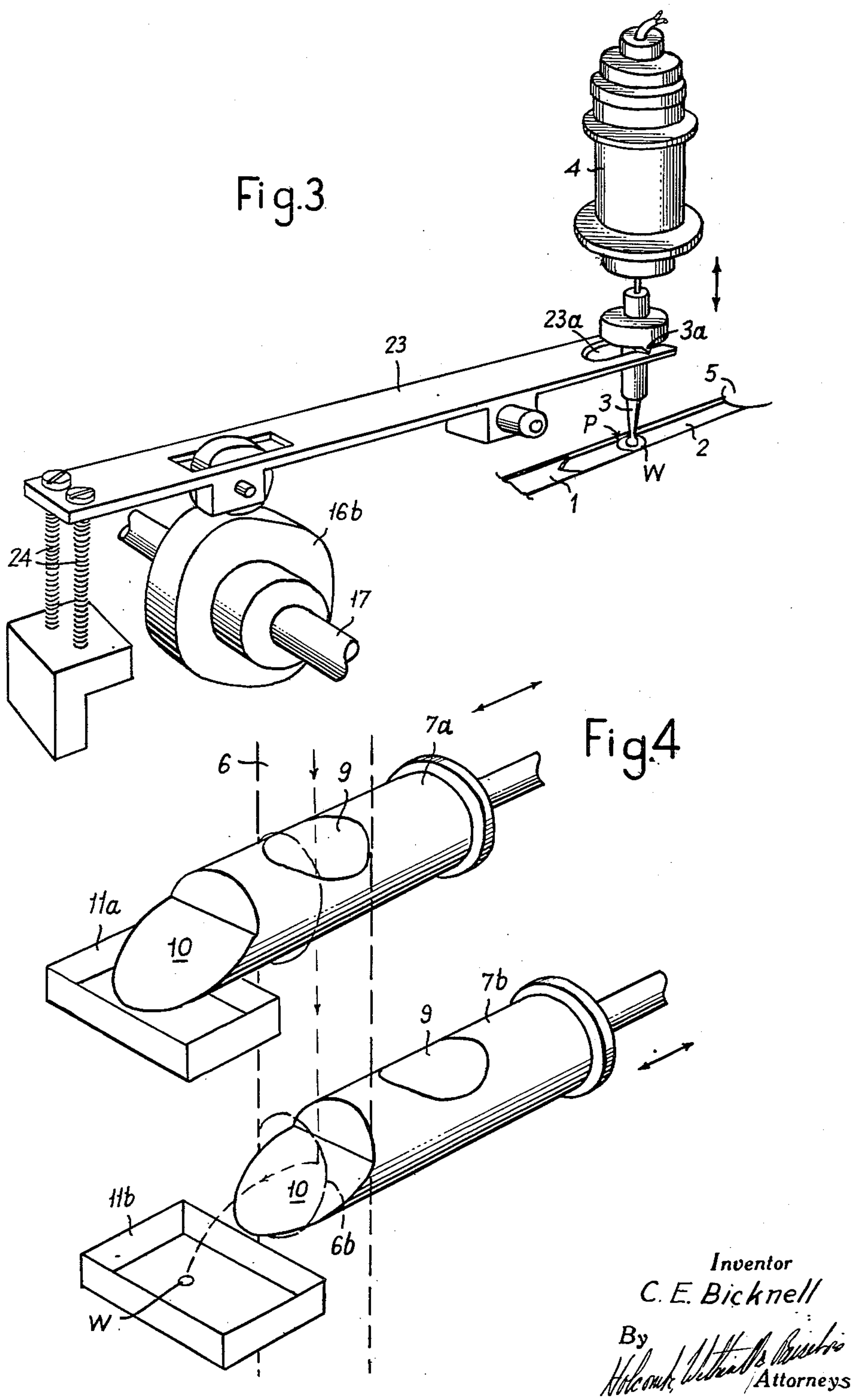
Figure 5:
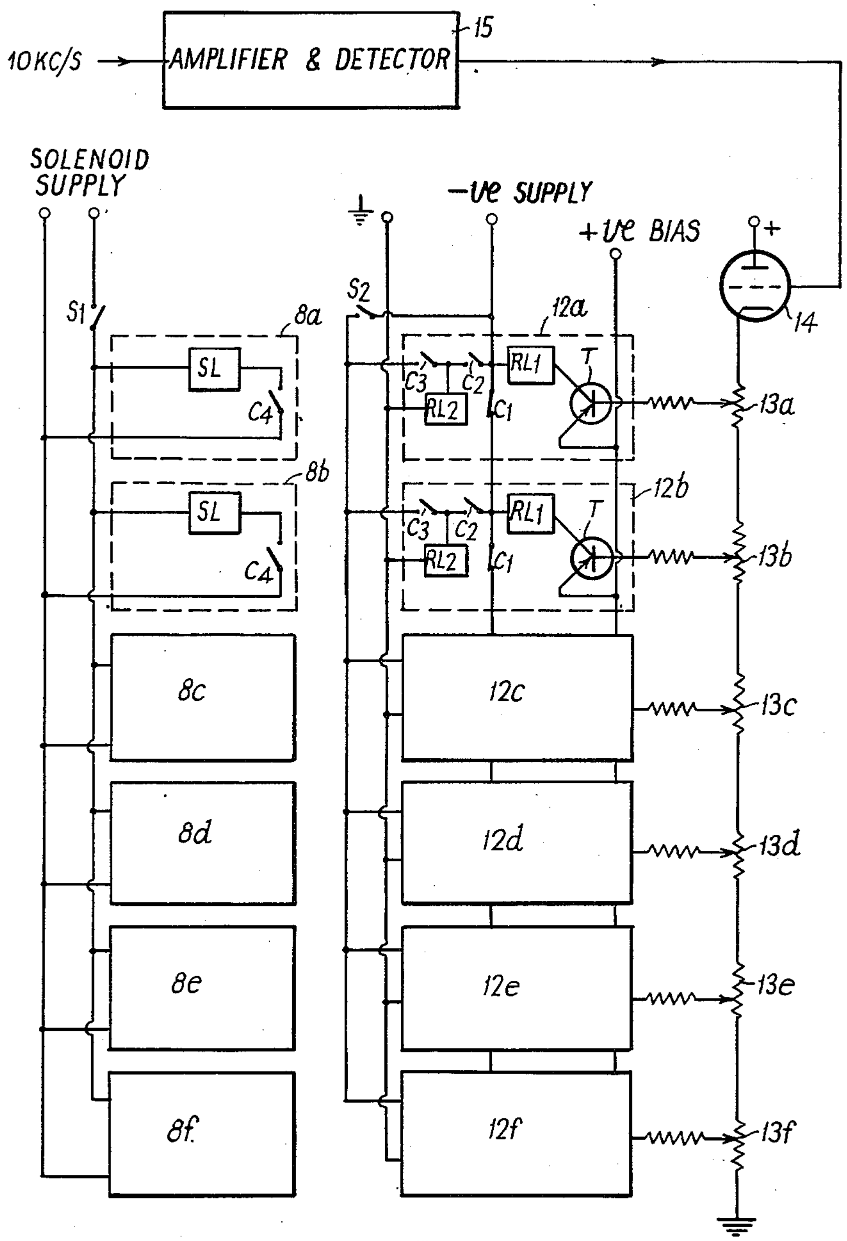

In order that the invention may be more fully understood, reference will now be made to the accompanying drawings in which:

FIGURE 1 is a diagrammatic representation of one embodiment of machine according to the invention, FIGURE 2 is a perspective view of the wafer feed mechanism of the machine shown in FIG. 1, FIGURE 3 is a perspective view of the operating mechanism for the measuring device of the machine shown in FIG. 1, FIGURE 4 is a perspective view of part of the wafer sorting mechanism of the machine in FIG. 1, and FIGURE 5 is a circuit diagram of the circuits controlling the operation of the wafer sorting mechanism.

The machine to be described is particularly intended for accurately measuring, sorting and counting circular germanium wafers of approximately 0.080 inch diameter and ranging between 0.0025 and 0.005 inch in thickness; the wafers being sorted into seven separate batches covering the following thickness ranges:

(*a*) 0.0029 to 0.0031 inch.
(*b*) 0.0031 to 0.0033 inch.
(*c*) 0.0033 to 0.0035 inch.
(*d*) 0.0035 to 0.0037 inch.
(*e*) 0.0037 to 0.0039 inch.
(*f*) 0.0039 to 0.005 inch.
(*g*) Wafers below 0.0029 inch and above 0.005 inch.

The machine has to operate in clean air and without damage to the wafers, particularly with regard to the wafer surfaces.

Referring to FIGURE 1 of the drawings, the machine generally comprises a feed finger 1, for feeding wafers of semiconductor material to be measured along a channel 2 to a position P beneath a probe 3 on a measuring device 4 which can be lowered to engage the upper surface of a wafer and measure its thickness. The measuring device produces an electrical output signal varying with the thickness of the wafer. The feed finger retracts during the measuring operation by the probe, and then moves forward again to push a measured wafer from the measuring position P further along the channel 2 until it falls through a funnel shaped aperture 5 and down a selector tube 6 across which extend six plungers 7*a* to 7*f* operated by solenoids 8*a* to 8*f*. Each plunger is provided with an aperture 9 of the same diameter as the bore of the tube 6, and a deflector portion 10. (See also FIG. 4.) Containers 11*a* to 11*f* are associated respectively with plungers 7*a* to 7*f* and a further container 11*g* is arranged at the bottom of the tube 6. The plunger solenoids 8*a* to 8*f* are, controlled by relay circuits 12*a* to 12*f*, each including a transistor switch device, the transistor switch device being controlled respectively by potentials derived from potentiometers 13*a* to 13*f* connected in series in the cathode of a cathode follower stage 14. The cathode follower 14 is fed from the amplifier and detector 15 which is in turn fed with the output signal of the measuring device 4, which varies in dependence upon the thickness of the wafer being measured. As will be described more fully later, the output signal produced by the measuring device upon measurement of the thickness of a wafer determines which plunger is operated to direct a wafer into the appropriate container by means of the deflector portion 10. The non-operated plungers allow free travel of the wafer down the tube since the aperture 9 in each plunger is coaxial with the bore of the tube.

The sequence of operation of the machine is controlled by means of cams 16*a* to 16*d* mounted on a cam shaft 17. The cam 16*a* controls the movement of the feed finger 1, the cam 16*b* controls the raising and lowering of the probe 3 of the measuring device through lever 23, the cam 16*c* controls the operation of a switch S1 which in turn controls the operation of the plungers, and the cam 16*d* controls the operation of a further switch S2 which in turn controls the operation of the relay circuits.

The machine also includes two counters CT1 and CT2 one of which CT1 gives a visual indication of the total number of wafers within the selected size ranges, i.e. between 0.0029 and 0.005 inch in the present embodiment, and the other of which CT2 gives an indication of the total number of wafers in one particular thickness range, e.g. the range 0.0029 to 0.0031 inch. The counters are electrically operated by the selector plungers. The electrical operation of counter CT1 is achieved by associating a set of normally open contacts with each plunger which are closed upon operation of the associated plunger to operate the counter. The operation of counter CT2 is achieved by providing a further set of normally open contacts in association with the plunger operated by the selected thickness range to be indicated on counter CT2, these latter contacts closing upon operation of that plunger. The machine is driven by an electric motor through a magnetic clutch (not shown) to the cam shaft 17. The cams 16*a* to 16*d* are adjustable for timing so that they operate in the desired manner.

Referring now more particularly to FIGURE 2, the wafer feed mechanism for feeding the individual wafers to the measuring position P and selector tube consist of a slide 18 operated by the cam 16*a* through roller 20 and connected to the feed finger 1. The roller 20 is retained in contact with the cam surfaces by means of a spring (not shown). Wafers W are introduced manually or automatically into the wafer channel 2 when the slide is in the rear or loading position via a feed slot 21 at right angles to the wafer channel 2. In this position the feed finger 1 operating up and down the wafer channel is to the rear of the feed slot as shown in broken lines at 1*a*. The feed finger 1 is arranged so that it can travel in very close proximity to the bottom of the channel 2 so as to prevent wafers feeding under it but so that it does not bear on the channel with consequent wear of the channel at the measuring position. Means are provided for adjusting the feed finger to the desired position. The feed finger is provided with a V-shaped notch 22 which embraces the circumference of the disc-shaped wafers W and helps to locate each wafer during the forward movement of the feed finger and so that it is automatically accurately positioned for measurement when it reaches the measuring position P in the channel 2. The movement of the slide 18 and of the feed finger 1 is controlled by means of the cam 16*a* which is shaped so as to allow the feed finger to push a wafer to the measuring position P, the feed finger then retracting during the measuring operation to ensure that no disturbing contact is made with the wafer when a measurement is being effected. After measurement, the slide 18 and feed finger 1 again move forward under the action of cam 16*a* and the feed finger pushes the wafer along the feed channel from the measuring position to the funnel shaped aperture 5 through which it falls into the selector tube 6. As seen in FIG. 3, the probe 3 of the measuring device 4 is lifted from and lowered gently on to a wafer to be measured at the measuring position by means of the lever 23 operated by cam 16*b* and timed in relation to the feed of the wafer to the measuring position by finger 1. The lever 23 is spring-loaded against the cam 16*b* by springs 24. In operation the forked end 23*a* of the lever 23 transmits movement by means of a knife edge collar 3*a* of the probe 3. This collar 3*a* is adjustable to ensure that the probe is completely clear of the lever in both the zero and measuring positions. The probe mounting is universally adjustable to give the very exact settings required and so that the probe is positioned to measure the wafer at its centre.

The measuring device 4 itself consists of a differential inductive measuring device, such as a "Magna gage" in which the probe is connected to a magnetic armature moving inside two coils, movement of the probe increasing the inductance of one coil and reducing the inductance of the other. This differential inductance is fed with a stabilised alternating signal of 10 kc.'s. Movement of the probe and hence of the armature produces a change in phase of the output signal from the zero position, depending upon the position of the probe as determined by the thickness of a wafer being measured. This output signal is employed to operate the desired plunger as will be fully explained later with reference to FIGURE 5.

A part of the wafer sorting mechanism is more fully shown in FIGURE 4. In this figure only two of the plungers 7*a* and 7*b* and associated containers 11*a* and 11*b* are shown for the sake of clarity: As previously described, after measurement of the wafer it is allowed to drop into the selector tube 6 and falls by gravity down this tube. The plungers are normally positioned in relation to the tube 6 so that the apertures 9 therethrough are coaxial with the bore of the tube whereby a wafer can drop through the apertures and its passage down the tube is not impeded by any plunger. However a signal produced from the measuring device 4 and fed through the amplifier and detector 15 and cathode follower 14 operates the solenoid and plunger associated with the container intended to receive a wafer of the thickness measured by the measuring device 4. The energization of the solenoid moves that plunger (as shown for plunger 7*b* in FIGS. 1 and 4) so that the deflecting portion 10 is positioned across the bore of the tube. Thus a wafer W falling down the tube (FIG. 4) hits the deflecting portion 10 of the appropriate plunger and is deflected into the associated container 11*b* through an opening 6*b* in the wall of the tube 6. If the wafer measured is outside the limits of the size ranges to be sorted i.e. in the present embodiment below 0.0029 inch or above 0.005 inch, none of the plungers is operated and the wafer therefore falls past all the plungers straight through their apertures 9 and down the selector tube 6 to the container 11g (FIG. 1) at the bottom of that tube.

The wafer containers 11a to 11g may consist of drawers arranged in a frame adjacent the selector tube and of a size to contain several thousand wafers. Lids are provided to enable the wafers to be kept free from dust and dirt when removed from the machine. The containers may be coloured to assist size identification. A safety device (not shown) in the form of a switch or switches may be associated with the drawers which prevents the operation of the machine unless all the drawers are in their correct positions.

The manner in which the sorting mechanism operates in response to the output signal from the measuring device will now be described with reference to FIGURE 5. The 10 kc./s. output signal from the measuring device 4 which changes in phase according to the thickness of the wafer being measured is amplified in the unit 15 and also converted to D.C. in a phase-sensitive rectifier circuit, the D.C. output being passed to the input of the cathode follower valve 14. The cathode load of the cathode follower consists of the potentiometers 13a to 13f connected in series, the sliders of which are connected respectively to the relay circuits 12a to 12f. Each relay circuit includes a grounded-emitter transistor amplifier T having a relay RL1 in the collector circuit and also includes a separate relay RL2 operated by RL1. Only two of the relay circuits, 12a and 12b have been shown in detail but it will be understood that the remaining relay circuits for the control of the remaining plungers are similar. The emitter of all of the transistors T are connected to a positive bias voltage and the collector of each transistor is connected in series with the relay coil of RL1 which operates two sets of single pole contacts *c1* and *c2*. When any transistor T conducts, the contacts *c1* open to disconnect the supply voltage from the collector of the transistor T immediately below it in the cathode follower load. The other contact set *c2* closes and energises the further relay RL2 which also carries two sets of single pole contacts *c3* and *c4*, normally open. When this latter relay RL2 is energised, one set of contacts *c4* closes to complete the circuit of the solenoid SL controlling the associated plunger through a delay microswitch S1 which is held open by cam 16c until after the measuring probe has lifted clear of the wafer, which avoids shattering of the wafer due to vibration caused by movement of the plunger transmitted to the wafer whilst it is in contact with the probe. The switch S1 is also held closed for sufficient time to ensure that the measured wafer has been directed by the deflecting portion of the operated plunger into the appropriate container. The other set of contacts *c3* closes to hold the relay RL2 on, and is wired in series with the further microswitch S2 which is timed by the operating cam 16d to close during the measuring period and to open before the solenoid is de-energised.

The gain of the respective transistors T in the relay circuits 12a to 12f is adjusted by potentiometers 13a to 13f so that the relays of each circuit and plunger solenoid are energised for signal outputs from the measuring device corresponding to the range of thicknesses of wafer to be deflected by the plunger associated with that circuit. Thus, the transistor in relay circuit 12a may be biassed to conduct for signals corresponding to a wafer thickness of 0.0029 to 0.0031 inch; the transistor of relay circuit 12b may be biassed to conduct for signals corresponding to a thickness of 0.0031 to 0.0035 inch, and so on.

It will be seen that the present invention provides a machine which can automatically and accurately measure the thickness of small wafers of semiconductor material, sort the wafers according to thickness and count them, without damage to the wafers by breakage or damage to their surfaces.

Whilst a particular embodiment has been described it will be understood that various modifications may be made without departing from the scope of this invention. Thus although the machine as specifically described is designed to sort measured wafers into seven size ranges it will be appreciated that a machine can be designed to sort wafers into any given number of size ranges, within reason. Moreover other types of measuring device may be employed besides that particularly described so long as they are capable of producing an electrical output signal which varies in character in dependence upon the thickness of the wafer to be measured.

I claim:

1. A machine for handling wafers of semiconductor material comprising a feed member for feeding each of the wafers to a measuring position in which the wafer is stationary, means for retracting the feed member from a positioned wafer during a measuring operation, a measuring device, means for lowering the measuring device into contact with the upper surface of a wafer in the measuring position to determine its thickness, means for producing an electrical output from the measuring device which varies according to the thickness of the wafer, and means for again moving the feed member into engagement with a wafer after it has been measured in order to move the wafer from the measuring position to a further position from whence it travels to its desired location as determined by the measurement effected.

2. A machine for handling wafers of semiconductor material comprising a feed finger slidable in a channel for feeding each of the wafers along the channel to a measuring position in which the wafer is stationary, means for retracting the feed finger from a positioned wafer during a measuring operation, a probe device, means for lowering the probe device into contact with the upper surface of a wafer in the measuring position to determine its thickness, means for producing an electrical output from the probe device which varies according to the thickness of the wafer, means for raising the probe device, means for again moving the feed finger into engagement with a wafer after it has been measured in order to move the wafer from the measuring position further along the channel to a further position from whence it is directed to its desired location as determined by the measurement effected.

3. A machine as claimed in claim 2, in which the tip of the feed finger is formed with a V-shaped notch which embraces a wafer to locate it during forward movement of the feed finger.

4. A machine for handling wafers of semiconductor material comprising a feed finger for feeding each of the wafers to a measuring position in which the wafer is stationary, means for retracting the feed finger from a positioned wafer during a measuring operation, a measuring device, means for lowering the measuring device into contact with the upper surface of a wafer in the measuring position to determine its thickness, means for producing an electrical output from the measuring device which varies according to the thickness of the wafer, means for raising the measuring device, means for again moving the feed finger into engagement with a wafer after it has been measured in order to move the wafer from the measuring position to a further position from whence it travels to its desired location as determined by the measurement effected, a series of cams for controlling the movements of the feed finger and the raising and lowering of the measuring device and means for rotating the cams.

5. A machine for handling wafers of semiconductor material comprising a feed member for feeding each of the wafers to a measuring position in which the wafer is stationary, means for retracting the feed member from a positioned wafer during a measuring operation, a measuring device, means for lowering the measuring device into contact with the upper surface of a wafer in the measuring position to determine its thickness, means for producing an electrical output from the measuring device which varies according to the thickness of the wafer, means for raising the measuring device, means for again moving the feed member into engagement with a wafer after it has been measured in order to move the wafer from the measuring position to a further position where it can drop down a tube, said tube having a plurality of plungers slidably extending across it and each of said plungers having an aperture therethrough and a deflector portion, means for maintaining all of the plungers with their apertures in line with the tube when in the non-operated position and means for operating a different one of said plungers in response to different output signals from the measuring device representing different ranges of thickness for the wafers to move the appropriate plunger upon measuring a wafer thickness within a given range so that its deflector portion is located in the tube and deflects a measured wafer falling thereon out through an aperture in the tube into a container associated with that plunger.

6. A machine as claimed in claim 5, in which means are provided to delay the operation of the appropriate plunger until after the measuring device is out of contact with the wafer, having completed the measuring operation, in order to prevent the operation of the plungers from upsetting the measuring operation due to vibration.

7. A machine as claimed in claim 6, in which said delay means consist of a switch controlled in conjunction with the raising and lowering of the measuring device.

8. A machine as claimed in claim 5, in which the measuring device comprises a differential inductance fed with an alternating electric signal and producing an output which changes in phase in dependence on thickness of the wafer being measured.

9. A machine as claimed in claim 8, in which the signal from the measuring device which changes in phase according to the thickness of the wafer being measured is amplified and converted to a D.C. signal in a phase sensitive rectifier circuit, the D.C. signal being applied to the input of a cathode follower stage having circuits controlling the plungers connected to its cathode load.

10. A machine as claimed in claim 9, in which the circuit for controlling each plunger consists of a transistor amplifier and a relay arrangement, the emitter of each transistor being connected to an adjustable slider on a separate potentiometer and all of the potentiometers being connected in series to form the cathode load of the cathode follower.

11. A machine for handling wafers of semiconductor material comprising a feed finger for feeding each of the wafers to a measuring position in which the wafer is stationary, means for retracting the feed finger from a positioned wafer during a measuring operation, a probe device, means for lowering a probe device into contact with the upper surface of the wafer in the measuring position to determine its thickness, means for producing an electrical output from the probe device which varies according to the thickness of the wafer, means for raising the probe device, means for again moving the feed member into engagement with a wafer after it has been measured in order to move the wafer from the measuring position to a further position where it can drop down a tube, said tube having a plurality of plungers slidably extending across it and each of said plungers having an aperture therethrough and a deflector portion, means for maintaining all of the plungers with their apertures in line with the tube when in the non-operated position and means for operating a different one of said plungers in response to different output signals from the measuring device representing different ranges of thickness for the wafers to move the appropriate plunger upon measuring a wafer thickness within a given range so that its deflector portion is located in the tube and deflects a measured wafer falling thereon out through an aperture in the tube into a container associated with that plunger.

12. A machine for handling wafers of semiconductor material comprising a feed finger slidable in a channel for feeding each of the wafers along the channel to a measuring position in which the wafer is stationary, means for retracting the feed finger from a positioned wafer during a measuring operation, a probe device, means for lowering the probe device into contact with the upper surface of a wafer in the measuring position to determine its thickness, means for producing an electrical output from the probe device which varies according to the thickness of the wafer, means for raising the probe device, means for again moving the feed finger into engagement with a wafer after it has been measured in order to move the wafer from the measuring position further along the channel to a further position where it can drop down a tube, said tube having a plurality of plungers slidably extending across it and each of said plungers having an aperture therethrough and a deflector portion, means for maintaining all of the plungers with their apertures in line with the tube when in the non-operated position, means for operating a different one of said plungers in response to different output signals from the measuring device representing different ranges of thickness for the wafers to move the appropriate plunger upon measuring a wafer thickness within a given range so that its deflector portion is located in the tube and deflects a measured wafer falling thereon out through an aperture in the tube into a container associated with that plunger, a series of cams for controlling the movements of the feed finger and the raising and lowering of the measuring probe and means for rotating the cams.

13. A machine as claimed in claim 12, in which the tip of the feed finger is formed with a V-shaped notch which embraces a wafer to locate it during forward movement of the feed finger.

References Cited in the file of this patent

UNITED STATES PATENTS

| | | |
|---|---|---|
| 2,338,868 | Owens | Jan. 11, 1944 |
| 2,556,413 | Boosey | June 12, 1951 |
| 2,566,767 | Hunt | Sept. 4, 1951 |
| 2,634,859 | Jagen | Apr. 14, 1953 |
| 2,962,165 | Aller | Nov. 29, 1960 |